(12) United States Patent
Mau et al.

(10) Patent No.: US 8,944,396 B2
(45) Date of Patent: Feb. 3, 2015

(54) SCREEN SUPPORTING DEVICE AND TORSION ADJUSTING STRUCTURE

(71) Applicants: Lite-On Electronics (Guangzhou) Limited, Guangzhou (CN); Lite-On Technology Corporation, Taipei (TW)

(72) Inventors: Shu-Hua Mau, Taoyuan County (TW); Yue-Wen Jiang, Taoyuan County (TW)

(73) Assignees: Lite-On Electronics (Guangzhou) Limited, Guangzhou (CN); Lite-On Technology Corporation, Taipei (TW)

( * ) Notice: Subject to any disclaimer, the term of this patent is extended or adjusted under 35 U.S.C. 154(b) by 0 days.

(21) Appl. No.: 13/925,042

(22) Filed: Jun. 24, 2013

(65) Prior Publication Data
US 2014/0252181 A1 Sep. 11, 2014

(30) Foreign Application Priority Data

Mar. 6, 2013 (CN) .......................... 2013 1 0071750

(51) Int. Cl.
*E04G 3/00* (2006.01)
*F16M 11/20* (2006.01)
*E05D 3/06* (2006.01)
*E05D 7/06* (2006.01)

(52) U.S. Cl.
CPC ............. *F16M 11/2021* (2013.01); *E05D 3/06* (2013.01); *E05D 7/06* (2013.01)
USPC .................. 248/284.1; 248/274.1; 248/276.1; 248/292.12; 248/292.13; 248/292.14; 361/679.21; 361/679.22; 361/679.58; 361/679.6; 361/679.61

(58) Field of Classification Search
CPC ................................ F16M 11/10; F16M 11/12

USPC .................. 248/274.1, 276.1, 284.1, 292.12, 248/292.13, 292.14; 361/679.21, 679.22, 361/679.58, 679.6, 679.61; 16/366, 368, 16/369, 354
See application file for complete search history.

(56) References Cited

U.S. PATENT DOCUMENTS

| | | | | |
|---|---|---|---|---|
| 7,338,019 B2* | 3/2008 | Liu et al. | ................... | 248/123.11 |
| 7,413,152 B1* | 8/2008 | Chen | .......................... | 248/176.1 |
| 7,431,254 B2* | 10/2008 | Cheng | ........................ | 248/292.12 |
| 7,530,541 B2* | 5/2009 | Wang et al. | ................. | 248/284.1 |
| 7,597,302 B2* | 10/2009 | Lee et al. | ........................ | 248/371 |
| 7,753,331 B2* | 7/2010 | Tang et al. | ................. | 248/284.1 |
| 7,789,363 B2* | 9/2010 | Duan | .......................... | 248/284.1 |
| 7,926,778 B2* | 4/2011 | Yen et al. | ....................... | 248/371 |
| 8,196,875 B2* | 6/2012 | Lien et al. | ..................... | 248/121 |
| 8,199,473 B2* | 6/2012 | Zhou | ........................ | 361/679.22 |

(Continued)

*Primary Examiner* — Terrell McKinnon
*Assistant Examiner* — Michael McDuffie
(74) *Attorney, Agent, or Firm* — Li & Cai Intellectual Property (USA) Office

(57) ABSTRACT

A torsion adjusting structure, which is installed on a shaft and a carrying member pivoted on the shaft, includes a gear, a pair of friction washers, and a linkage assembly. The shaft passes through the gear and the friction washers respectively abutted on two opposite surfaces of the gear. The linkage assembly installed on the carrying member has an engaging portion. The linkage assembly is adjusted between an engaging position and a separating position. When the linkage assembly is at the engaging position, the engaging portion engages with the gear for enabling rotation of the carrying member to rotate the gear to rub the friction washers, thereby providing the carrying member with an additional torsion. When the linkage assembly is at the separating position, the engaging portion separates from the gear for maintaining the relative position between the gear and the friction washers.

10 Claims, 9 Drawing Sheets

(56) References Cited

U.S. PATENT DOCUMENTS

| | | | |
|---|---|---|---|
| 8,201,792 B2* | 6/2012 | Yuan et al. | 248/299.1 |
| 8,584,320 B2* | 11/2013 | Lin | 16/320 |
| 8,797,765 B2* | 8/2014 | Lin et al. | 361/807 |
| 2003/0208881 A1* | 11/2003 | Li | 16/330 |
| 2009/0072112 A1* | 3/2009 | Lee et al. | 248/371 |
| 2011/0289728 A1* | 12/2011 | Wang et al. | 16/337 |
| 2012/0248048 A1* | 10/2012 | Wu et al. | 211/26 |

* cited by examiner

SCREEN SUPPORTING DEVICE AND TORSION ADJUSTING STRUCTURE

BACKGROUND OF THE INVENTION

1. Field of the Invention

The instant disclosure relates to a supporting device; more particularly, to a screen supporting device capable of adjusting torsion and a torsion adjusting structure.

2. Description of Related Art

The conventional screen supporting device has the washers installed via the screw, in which a normal force generated upon screwing presses the washers for providing a constant torsion to the conventional screen supporting device. If the torsion of the user's demand is larger, the construction of washer is manufactured larger for fitting the torsional demand. That is to say the washer has a larger cross-section.

However, the carrying member of the conventional screen supporting device is used for loading a screen, and the torsional demand of the carrying member is designed according to the weight of screen. That is to say, the torsion of the conventional screen supporting device is not adjustable.

Due to the popularity of the touch-control screen, when using the touch-control screen, the screen supporting device needs larger torsion. However, when collapsing the touch-control screen, the screen supporting device needs smaller torsion. Thus, the conventional screen supporting device cannot achieve the torsion being adjustable.

To achieve the abovementioned improvement, the inventors strive via industrial experience and academic research to present the instant disclosure, which can provide additional improvement as mentioned above.

SUMMARY OF THE INVENTION

One embodiment of the instant disclosure provides a screen supporting device and a torsion adjusting structure each used for providing two different torsions, such that the user can select the suitable torsion according to different condition.

The screen supporting device, comprises a bottom seat; a frame module having two opposite end portions respectively defined as a bottom end portion and a top end portion, wherein the bottom end portion is pivotally coupled to the bottom seat along a rotation axis; a hinge structure pivotally coupled to the top end portion of the frame module, wherein the hinge structure comprises: a shaft coupled through the top end portion of the frame module, wherein the shaft has a non-circular cross-section, a longitudinal direction of the shaft is defined as a central axis parallel to the rotation axis; and a washer assembly sleeved at the shaft; a carrying member for carrying a screen, the carrying member having a thru hole, wherein the shaft is inserted into the thru hole of the carrying member, and the carrying member is pivotable with respect to the shaft along the central axis; and a torsion adjusting structure, comprising: a gear formed with a circular thru hole along an axial direction thereof, wherein the shaft is inserted into the thru hole of the gear, and the gear is axially rotatable with respect to the shaft along the central axis; a pair of friction washers, each of the friction washers having a non-circular positioning opening conforming with the cross-section of the shaft, wherein the shaft is inserted into the positioning opening, and the friction washers respectively abut against two opposite surfaces of the gear; and a linkage assembly coupled to the carrying member and having an engaging portion, wherein a longitudinal direction of the engaging portion and the axial direction of the gear are parallel to the central axis, a predetermined distance between the engaging portion and the central axis is smaller than a radius of an addendum circle of the gear, and the engaging portion is movable between any two adjacent teeth of the gear, wherein when the linkage assembly horizontally moves along the central axis, the engaging portion is horizontally displaced with respect to the gear and along the central axis, the engaging portion moves along the central axis and parallel to the gear for adjusting the linkage assembly to shift to an engaging position or a separating position in relation to the carrying member; wherein when the engaging portion is engaged between any two adjacent teeth of the gear, the position of the linkage assembly is defined as the engaging position, and the positions of the shaft and the friction washers sleeved at the shaft hold still, the rotation of the carrying member drives the gear to axially rotate along the central axis to rub the friction washers, based on the engaging portion of the linkage assembly has engaged the gear, thereby providing the carrying member with an additional torsion; wherein when the engaging portion is separated from the gear, the position of the linkage assembly is defined as the separating position, the positions of the shaft and the friction washers sleeved at the shaft hold still, the relative position between the gear and the friction washers is maintained when the carrying member is rotating.

The hinge structure applied for being installed on a shaft having a non-circular cross-section and a carrying member, wherein a longitudinal direction of the shaft is defined as a central axis, the carrying member for carrying a screen is pivotable with respect to the shaft along the central axis, the hinge structure comprises: a gear formed with a circular thru hole along an axial direction thereof, wherein the shaft is inserted into the thru hole of the gear, and the gear is axially rotatable with respect to the shaft along the central axis; a pair of friction washers, each of the friction washers having a non-circular positioning opening conforming with the cross-section of the shaft, wherein the shaft is inserted into the positioning opening of each friction washer, and the friction washers respectively abut against two opposite surfaces of the gear; and a linkage assembly coupled to the carrying member and having an engaging portion, wherein a longitudinal direction of the engaging portion and the axial direction of the gear are parallel to the central axis, a predetermined distance between the engaging portion and the central axis is smaller than a radius of an addendum circle of the gear, and the engaging portion is movable between any two adjacent teeth of the gear, wherein when the linkage assembly horizontally moves along the central axis, the engaging portion is horizontally displaced with respect to the gear and along the central axis, the engaging portion moves along the central axis and parallel to the gear for adjusting the linkage assembly to shift to an engaging position or a separating position in relation to the carrying member; wherein when the engaging portion is engaged between any two adjacent teeth of the gear, the position of the linkage assembly is defined as the engaging position, and the positions of the shaft and the friction washers sleeved at the shaft hold still, the rotation of the carrying member drives the gear to axially rotate along the central axis to rub the friction washers, based on the engaging portion of the linkage assembly has engaged the gear, thereby providing the carrying member with an additional torsion; wherein when the engaging portion is separated from the gear, the position of the linkage assembly is defined as the separating position, the positions of the shaft and the friction washers sleeved at the shaft hold still, the relative position between the gear and the friction washers is maintained when the carrying member is rotating.

Base on the above, the screen supporting device and the torsion adjusting structure each is configured to the co-operation of the linkage assembly, the gear, and the friction washers to provide the additional torsion selectively, such that the carrying member can be switched to locate at a high torsional state or a low torsional state.

In order to further appreciate the characteristics and technical contents of the instant disclosure, references are hereunder made to the detailed descriptions and appended drawings in connection with the instant disclosure. However, the appended drawings are merely shown for exemplary purposes, rather than being used to restrict the scope of the instant disclosure.

DETAILED DESCRIPTION OF THE PREFERRED EMBODIMENTS

Figure 1:
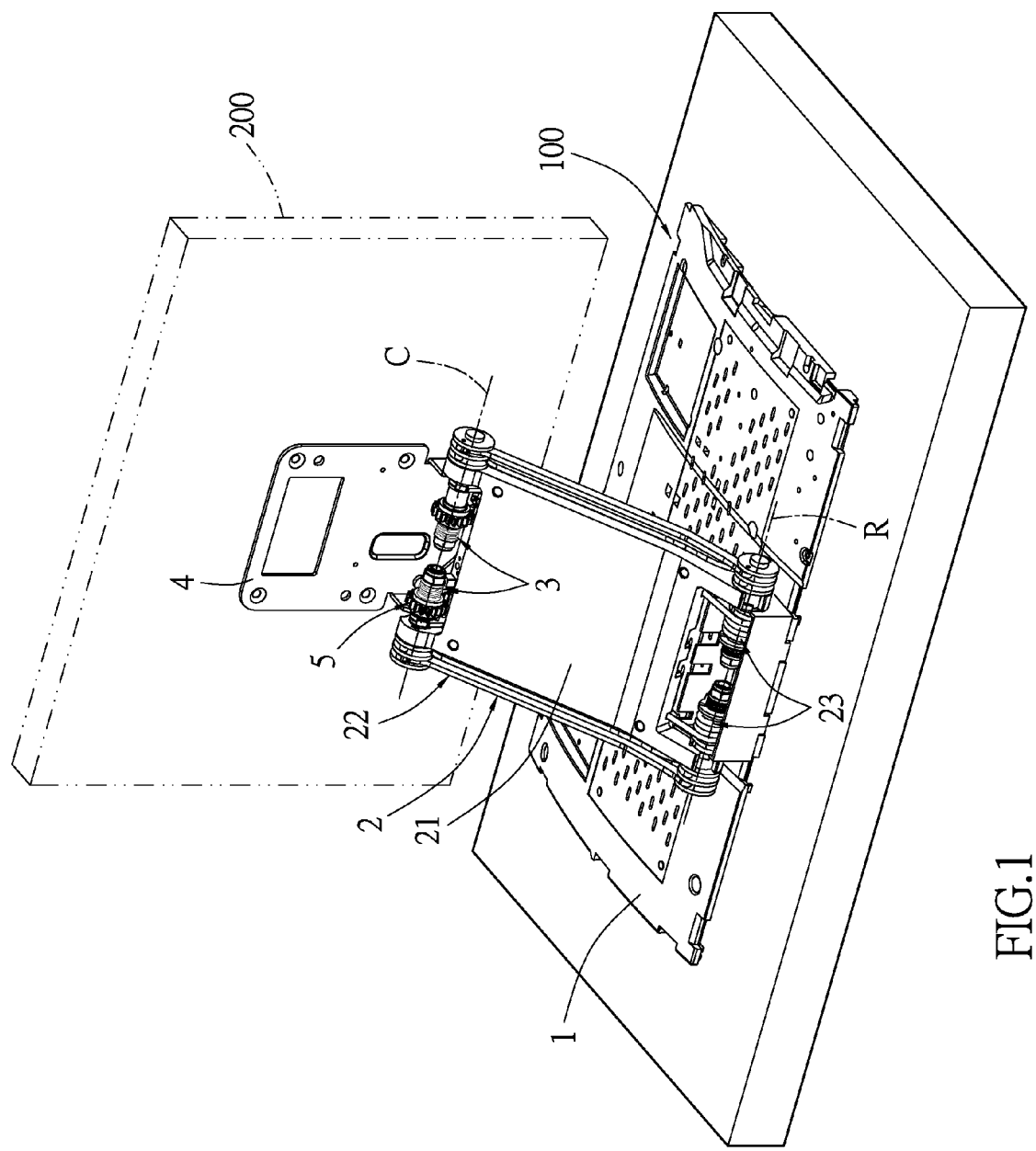
FIG. 1 is a perspective view of a screen supporting device according to the instant disclosure.

Please refer to FIG. 1, which shows an embodiment of the instant disclosure. The instant embodiment provides a screen supporting device 100 applied for loading a screen 200 (e.g., touch-control screen). The screen supporting device 100 includes a bottom seat 1, a frame module 2, two hinge structures 3, a carrying member 4, and a torsion adjusting structure 5.

The following description discloses the construction of each component and the relationship between the components of the screen supporting device 100 firstly, and then discloses the operating condition and the using state of the screen supporting device 100.

The bottom seat 1 can be disposed on a working surface (e.g., desktop). Two opposite end portions of the frame module 2 are respectively defined as a bottom end portion and a top end portion. The bottom end portion of the frame module 2 is pivotally coupled to one end of the bottom seat 1 (i.e., the left-lower end of the bottom seat 1 as shown in FIG. 1) along a rotation axis R. The top end portion of the frame module 2 is pivotally coupled to the hinge structures 3, the carrying member 4, and the torsion adjusting structure 5.

Specifically, the frame module 2 includes a main shaft 21 being an approximately H-shaped contour and having two four-bar linkages 22, and two pivoting units 23, in which each pivoting unit 23 has a torsion spring. The four-bar linkages 22 are respectively disposed on two opposite lateral sides of the main shaft 21 (i.e., the left side and the right side of the main body 21 as shown in FIG. 1). The bottom portion of the main shaft 21 and the bottom portion of each four-bar linkage 22 are pivotally coupled to the bottom seat 1 along the rotation axis R for allowing the frame module 2 to rotate with respect to the bottom seat 1 along the rotation axis R.

Moreover, because the pivoting relationship between the frame module 2 and the bottom seat 1 is not the important feature in the instant disclosure, so that the instant embodiment does not disclose the detail construction of the pivoting relationship. Furthermore, the four-bar linkages 22 can be parallel or non-parallel according to the designer's demand, and the type of the four-bar linkage 22 is not limited thereto.

The hinge structures 3 are respectively and pivotally coupled to two opposite sides of the top end portion of the frame module 2 (i.e., the left side and the right side of the top end portion of the frame module 2 as shown in FIG. 1). Because the hinge structures 3 are identical, the following figures only show an exploded view of one of the hinge structures 3 for explaining.

Figure 2:
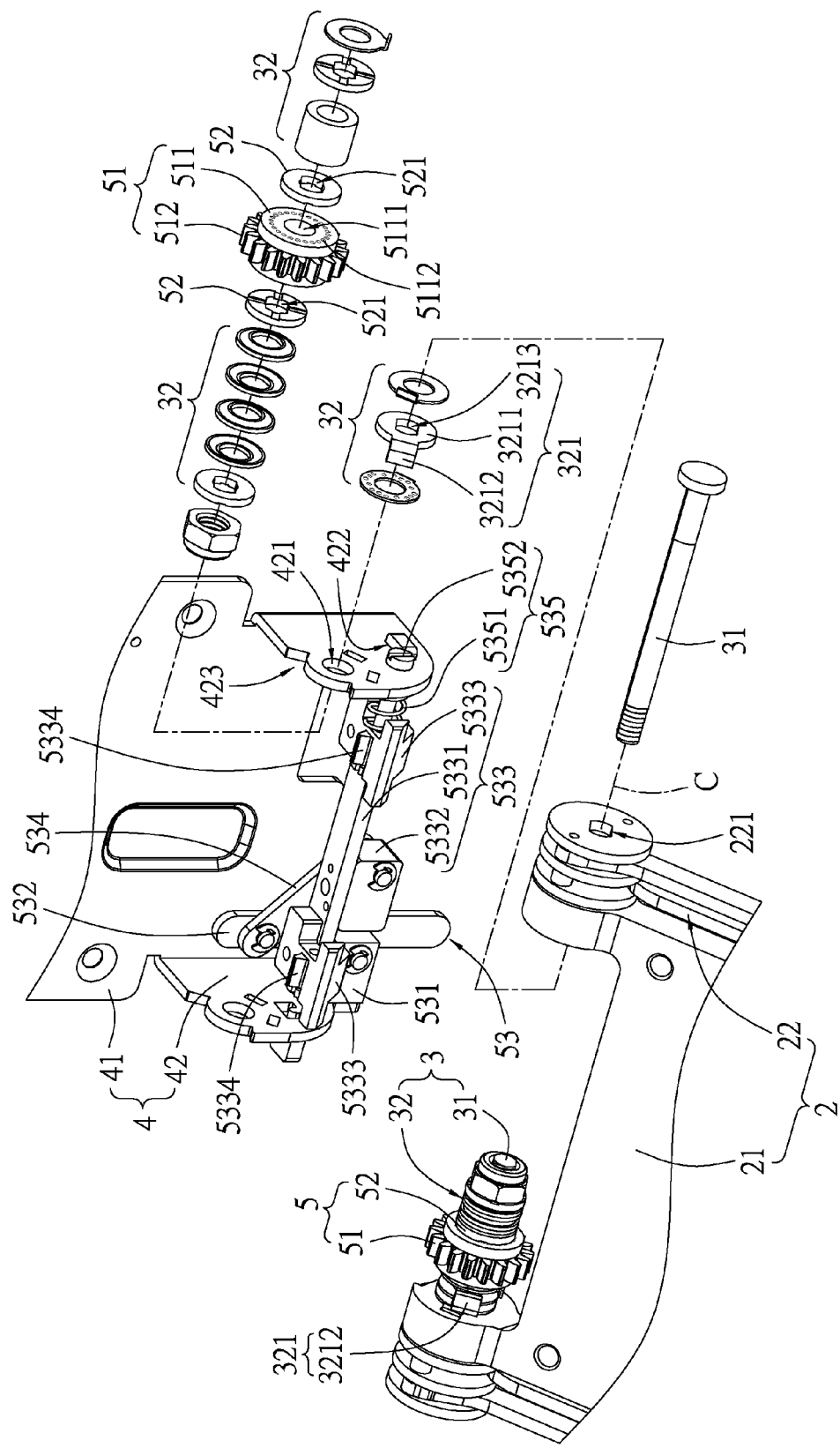
FIG. 2 is a partial exploded view of the screen supporting device according to the instant disclosure.
Figure 3:
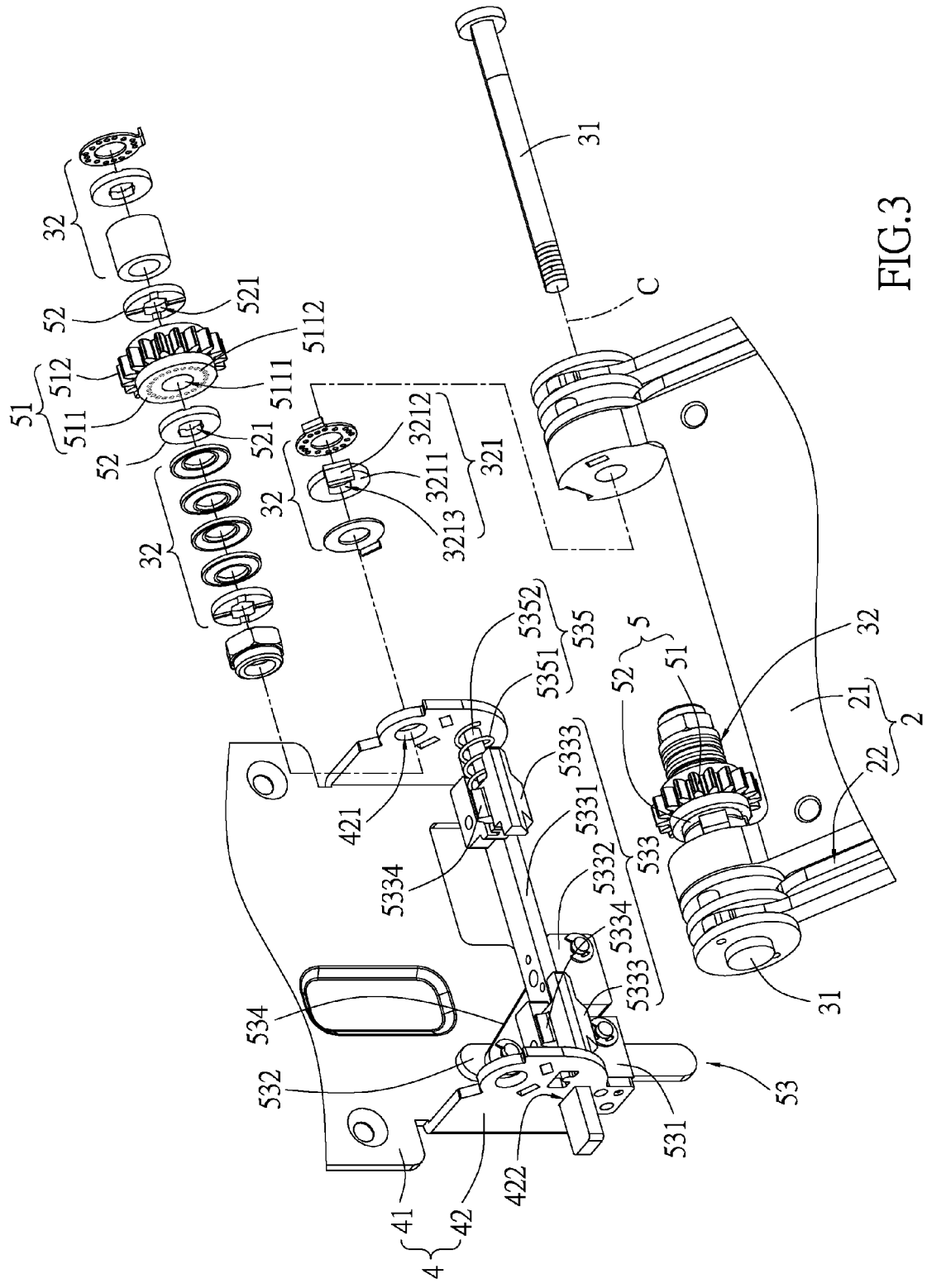
FIG. 3 is a partial exploded view of the screen supporting device from another viewing angle according to the instant disclosure.
Figure 4:
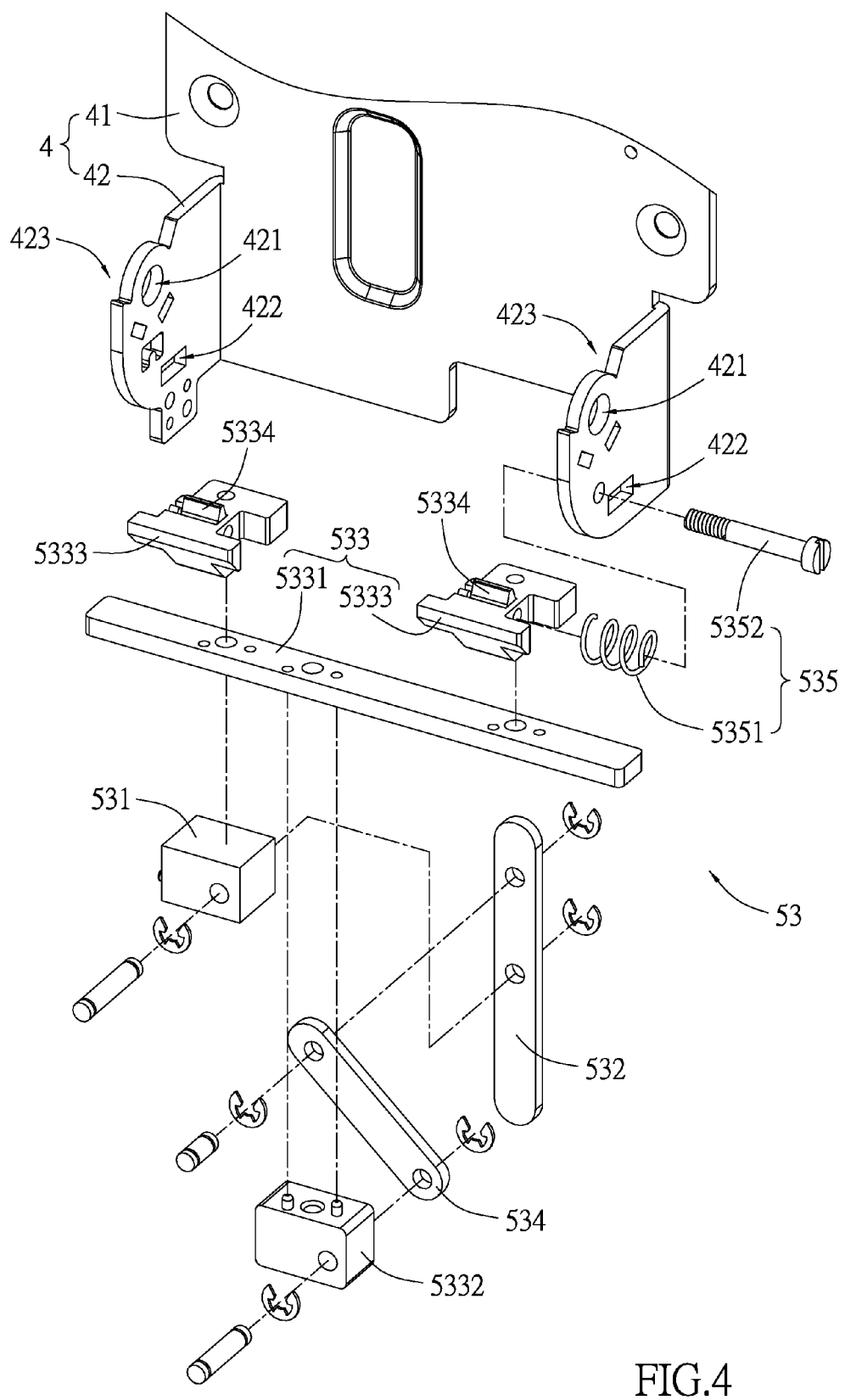
FIG. 4 is an exploded view of a linkage assembly of the screen supporting device according to the instant disclosure.

Specifically, please refer to FIGS. 2 and 3, and with reference occasionally made to FIG. 4. Each hinge structure 3 includes a shaft 31 and a washer assembly 32. The shaft 31 exhibits a non-circular cross-section (i.e., the cylinder are truncated along the longitudinal direction), and the longitudinal direction of the shaft 31 is defined as a central axis C.

The two shafts 31 are respectively coupled through the two opposite sides of the top end portion of the frame module 2, in which the top end portion of the frame module 2 is the top portion of the main shaft 21 and the top portion of each four-bar linkage 22. The central axes C defined by the shafts 31 are overlapping, that is to say, each shaft 31 falls on the same axis C, so that the central axes C are regarded as one central axis C in the following description. The central axis C is parallel to the rotation axis R.

Specifically, the top portion of each four-bar linkage 22 has a non-circular positioning opening 221 (as shown in FIG. 2) conforming in shape with the cross-section of each shaft 31. The shafts 31 respectively couple through the positioning openings 221 of the four-bar linkages 22, such that the frame module 2 supports the shafts 31.

Each washer assembly 32 has a plurality of washers, and the washer assemblies 32 are respectively sleeved at the shafts 31 along the central axis C. The type of the washer assembly 32 can be changed according to the designer's demand, and the instant embodiment is not intended to limit the instant disclosure to that as illustrated or described herein. Particularly, each washer assembly 32 has a stopping washer 321. The stopping washer 321 has a main sheet 3211 and a stopping sheet 3212 integrally extended and bent from the main sheet 3211. The main sheet 3211 is formed with a positioning opening 3213 on a central portion thereof. The positioning opening 3213 conforms with the cross-section of the shaft 31. The shafts 31 are respectively inserted into the positioning openings 3213 of the stopping washers 321 along the central axis C for maintaining the relative position between the each stopping washer 321 and each corresponding shaft 31.

The carrying member 4 is plate-like and has a carrying plate 41 and two connecting portions 42. The carrying plate 41 is used to provide the installation of the screen 200. The connecting portions 42 are respectively and bendingly extended from two opposite sides of a bottom portion of the carrying plate 41.

Moreover, each of the connecting portions 42 is formed with a thru hole 421 and a track opening 422 on a portion thereof facing to the other one. Each connecting portion 42 is formed with an arc groove 423 proximate to the thru hole 421. The shafts 31 are respectively inserted into the thru holes 421 of the connecting portions 42 along the central axis C for enabling the carrying member 4 to rotate with respect to the shafts 31 along the central axis C.

Specifically, the connecting portions 42 are arranged between the stopping washers 321 and respectively abut against the stopping washers 321. The stopping sheets 3212 of the stopping washers 321 are respectively received by the arc grooves 423, so that when the carrying member 4 is rotating, the rotatable angle of the carrying member 4 is restricted by each stopping sheet 3212 abutting two opposite end walls of the corresponding arc groove 23. That is to say, the rotatable angle of the carrying member 4 is approximately identical to the central angle of the arc groove 423. In other words, the carrying member 4 can rotate along the curve of the arc groove 423.

The torsion adjusting structure 5 includes two gears 51, two pairs of friction washers 52, and a linkage assembly 53. The type of gear 52 in the instant embodiment takes the spur gear for example, but the type and the corresponding construction of gear 52 are not limited to the instant embodiment.

Each gear 51 is formed with a circular thru hole 5111 along an axial direction thereof. Each friction washer 52 has a non-circular positioning opening 521 conforming with the cross-section of the shaft 31. Specifically, each gear 51 has a cylindrical main body 511 and a plurality of teeth 512. The thru hole 5111 of the gear 51 is formed by going through the center portion of the gear 51 from one end to the other along the axial direction. The teeth 512 of each gear 51 are radially extended from (an annular lateral surface of) the main body 511.

The thru holes 5111 of the gears 51 are respectively sleeved at the shafts 31 along the central axis C, and each gear 51 is axially rotatable with respect to the corresponding shaft 31 along the central axis C. Each shaft 31 is inserted into the positioning opening 521 of the corresponding friction washer 52, and each pair of friction washers 52 respectively abut against the two opposite end surfaces of the main body 511 of the corresponding gear 51. Specifically, each gear 51 and the corresponding friction washers 52 are arranged at the inner side of the adjacent connecting portion 42 and clipped between two washers of the corresponding washer assembly 32.

Additionally, the ends of the main body 511 of each gear 51 and the surfaces facing the friction washers 52 can be designed to have better friction effect according to the designer's demand, such that a larger friction force can be generated by rotating each gear 51 with respect to the corresponding friction washers 52 for increasing the torsion of the screen supporting device 100. For example, the gear 51 has a plurality of protrusions 5112 budding from the end of the main body 511 in an annular arrangement for abutting against the corresponding friction washers 52 to generate a friction force. Alternatively, a normal force generated by the contact of the gear 51 and the corresponding friction washers 52 can be adjusted according to the designer's demand for providing different friction force when the gear 51 is rotating with respect to the friction washers 52, thereby achieving the torsional adjustment. For example, the normal force generated by the contact of the gear 51 and the corresponding friction washers 52 can be increased by screwing the nut tightly.

Figure 5:
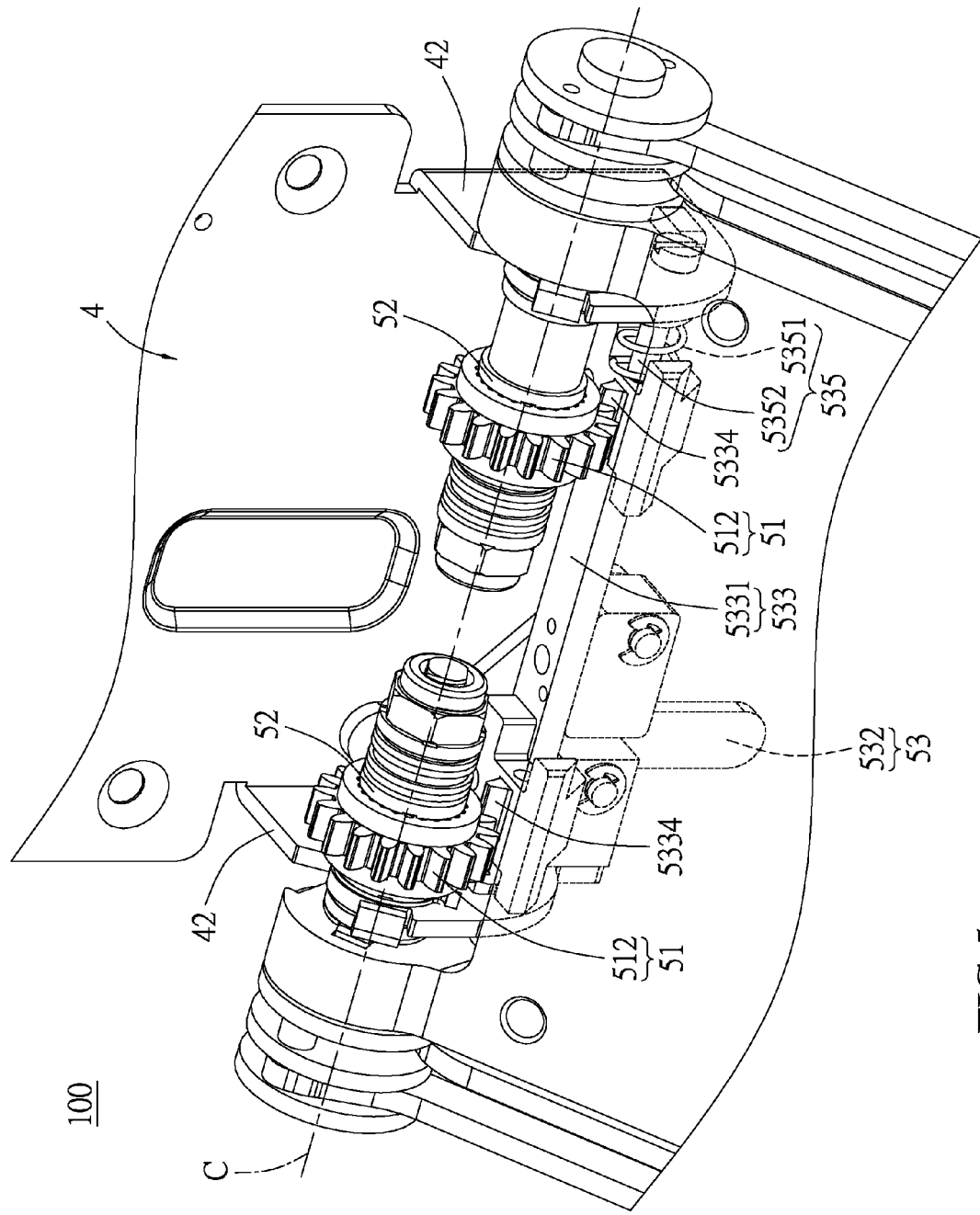
FIG. 5 is a partial cross-sectional view of the linkage assembly of the screen supporting device, which is at an engaging position, according to the instant disclosure.
Figure 6:
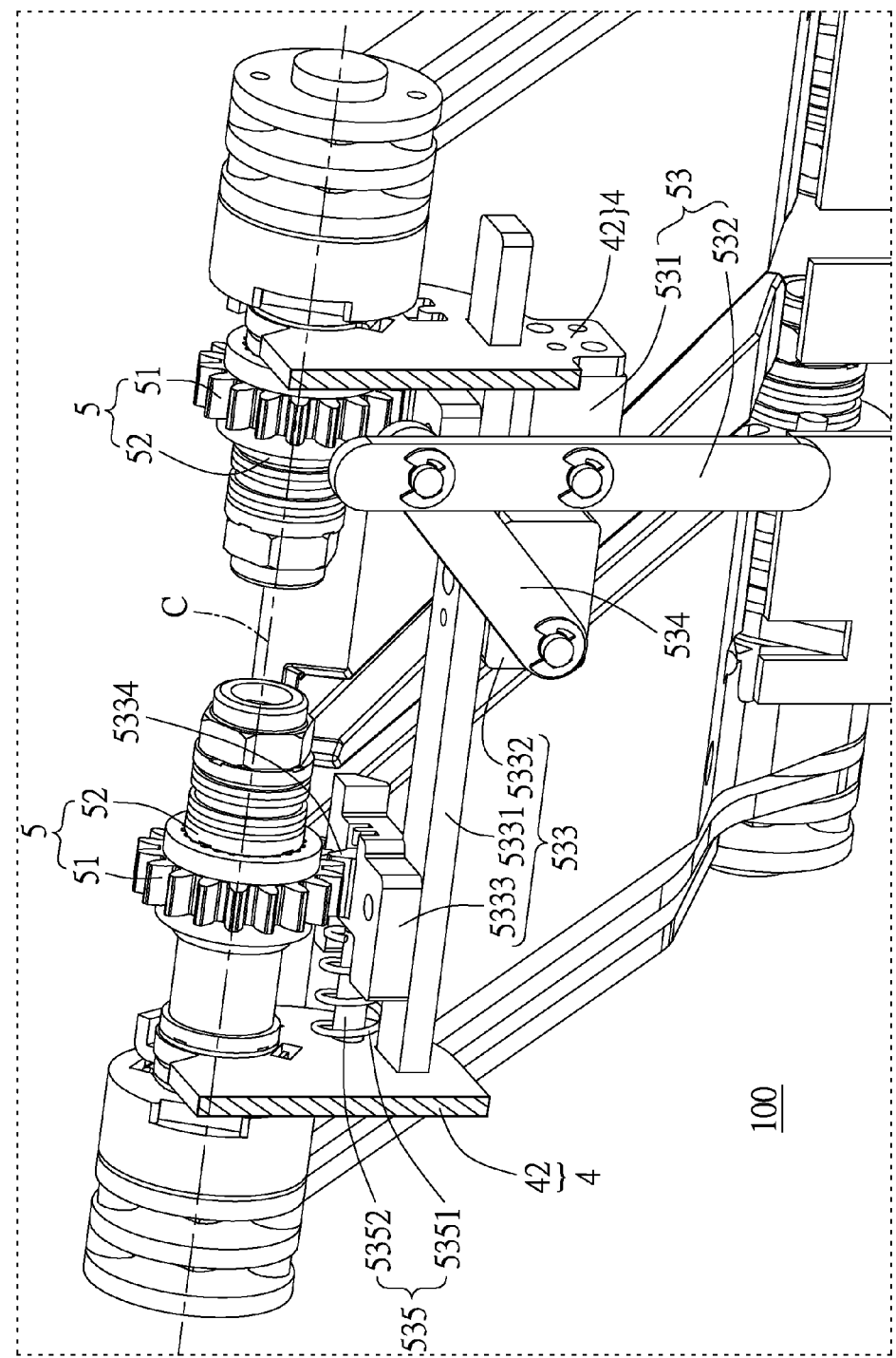
FIG. 6 is a partial cross-sectional view of the linkage assembly of the screen supporting device, which is at the engaging position, with another viewing angle according to the instant disclosure.
Figure 7:
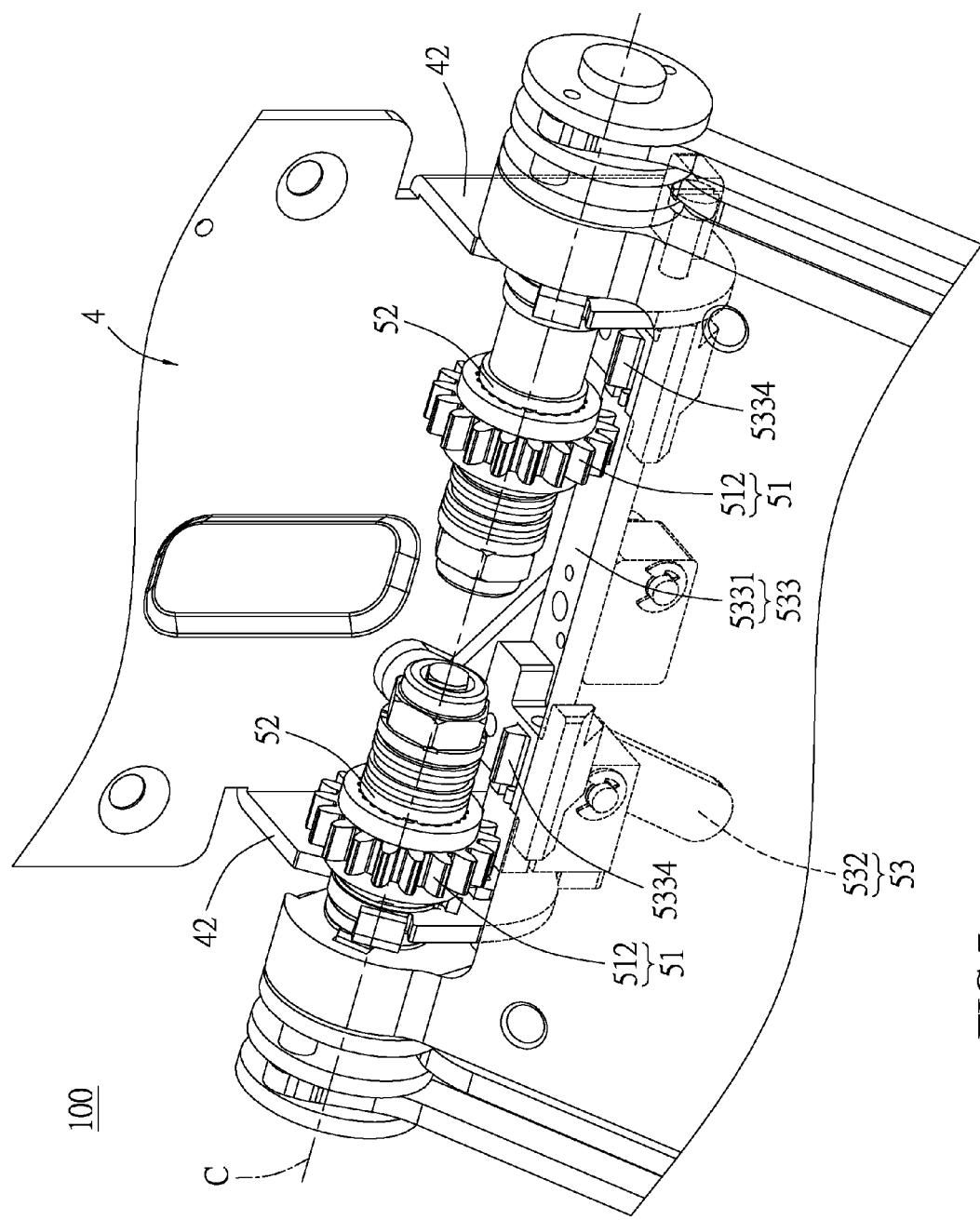
FIG. 7 is a partial cross-sectional view of the linkage assembly of the screen supporting device, which is at a separating position, according to the instant disclosure.
Figure 8:
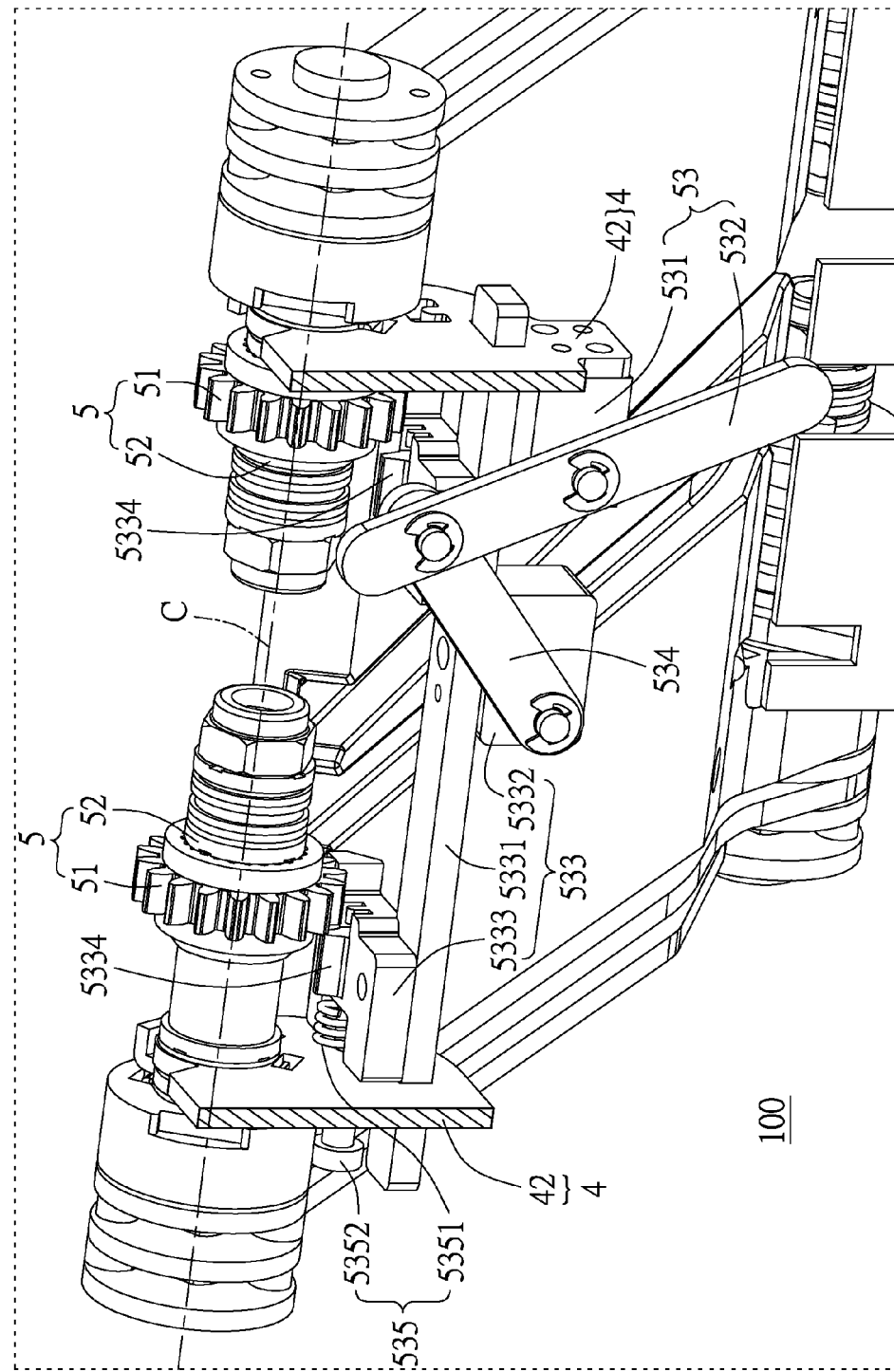
FIG. 8 is a partial cross-sectional view of the linkage assembly of the screen supporting device, which is at the engaging position, with another viewing angle according to the instant disclosure.

The linkage assembly 53 is approximately arranged inside a covering range of the carrying member 4, which is defined between the connecting portions 42, and installed on the connecting portions 42 of the carrying member 4. The linkage assembly 53 can be adjusted to shift to an engaging position (as shown in FIGS. 5 and 6) or a separate position (as shown in FIGS. 7 and 8) in relation to the carrying member 4.

Specifically, the linkage assembly 53 includes a positioning block 531, a swing bar 531, a sliding member 533, a connecting bar 534, and a returning member 535. The positioning block 531 is fixed on one of the connecting portions 42 of the carrying member 4, and the fixed position of the positioning block 532 and the corresponding connecting portion 42 is arranged under the track opening 422. The swing bar 532 is pivotally coupled to the positioning block 531, and a portion of the swing bar 532 is protruding out of the covering range of the carrying plate 41 for providing operation of the user.

Moreover, two opposite ends of the sliding member 533 are respectively coupled through the track openings 422 of the connecting portions 42. The sliding member 533 has two engaging portions 5334. The connecting bar 534 is pivotally coupled to the swing bar 532 and the sliding member 533. Any two of the swing bar 532, the sliding member 533, and the connecting bar 534 have a hinge axis substantially perpendicular to the central axis C. The distance between the carrying plate 41 and each one of the swing bar 532 and the connecting bar 534 is smaller than the distance between the carrying plate 41 and the sliding member 533. In other words, looking from the connecting portion 42, the sliding member 533, the swing bar 532, the connecting bar 534 and the carrying plate 41 are arranged in succession.

Thus, when swinging the swing bar 532 of the linkage assembly 53, the swing bar 532 drives the sliding member 533 by the connecting bar 534, such that the sliding member 533 is reciprocally moving along a direction parallel to the central axis C, and each engaging portion 5334 is moving respect to the corresponding gear 51 and parallel to the central axis C.

Specifically, the longitudinal direction of each engaging portion 5334 and the axial direction of each corresponding gear 51 are parallel to the central axis C. A predetermined distance between each engaging portion 5334 and the central axis C is smaller than a radius of the addendum circle of the corresponding gear 51, and each engaging portion 5334 is movable between any two adjacent teeth of the corresponding gear 51. Upon contacting, the engaging portion 5334 mates with the gear 51. In other words, the engaging portion 5334 can walk about the teeth 512. When the linkage assembly 53 is horizontally moving along the central axis C, each engaging portion 5334 has a horizontal displacement with respect to the corresponding gear 51 and along the central axis C, such that each engaging portion 5334 is moving along the central axis C and parallel to the corresponding gear 51 for adjusting the linkage assembly 53 to shift to the engaging position or the separating position with respect to the carrying member 4.

The returning member 535 abuts against the sliding member 533 and one of the connecting portions 42. When the sliding member 533 is sliding with respect to the corresponding connecting portion 42, the returning member 535 is compressed to store a returning force.

Thus, when the swing bar 532 is still, the engaging portions 5334 are respectively engaged with the gears 51, in which each engaging portion 5334 is engaged between any two adjacent teeth 512 of the corresponding gear 51, so that the position of the linkage assembly 53 is defined as the engaging position (as shown in FIGS. 5 and 6). Moreover, the sliding member 533 does not move with respect to the connecting portions 42, such that the returning member 535 is not pressed or pulled. The position of each shaft 31 is fixed because of the supporting by the frame module 2, and the position of the friction washers 52 over each shaft 31 is also fixed.

Meanwhile, when the carrying member 4 rotates, the carrying member 4 drives each gear 51 to axially rotate along the central axis C to rub the friction washers 52 in contact, based on the engaging portion 5334 of the linkage assembly 53 has engaged the gear 51, thereby providing the carrying member 4 with an additional torsion. In other words, the carrying member 4 is located at a high torsional state, so that the rotation of the carrying member 4 needs a larger power.

The level of the additional torsion can be changed by adjusting the friction force generated between each gear 51 and the friction washers 52 in contact. Particularly, the coefficient of friction or the normal force between each gear 51 and the friction washers 52 in contact can be increased to increase the friction force generated between each gear 51 and the friction washers 52, thereby increasing the additional torsion effectively.

When pushing the swing bar 532 to separate the engaging portions 5334 from the corresponding gears 51, the position of the linkage assembly 53 is defined as the separating position (as shown in FIGS. 7 and 8). The sliding member 533 is moving with respect to the connecting portions 42 to press or pull the returning member 535, such that the returning member 535 is deformed to store the returning force. Moreover, each shaft 31 and the corresponding friction washers 52 are still fixed.

At the same time, when the carrying member 4 rotates, each gear 51 is not driven and remains the position between each gear 51 and the corresponding friction washers 52. That is to say, the carrying member 4 is located at a low torsional state, so that the rotation of the carrying member 4 needs a smaller power. Additionally, if stopping the swing of the swing bar 532, the returning force stored by the returning member 535 causes the linkage assembly 53 to be adjusted from the separating position to the engaging position.

In addition, the connecting portions 42 can be changed to replace the positioning block 531. For example, please refer to FIG. 4. A portion of the connecting portion 42 located under the track opening 422 can be bent to the position of the positioning block 531 for pivotally coupling to the swing bar 532, thereby replacing the positioning block 531.

The design requirements of the sliding member 533 and the returning member 535 are disclosed as above, the implementation of sliding member 533 and the returning member 535 is disclosed as follows, but is not limit to the instant embodiment.

Please refer to FIG. 4, and with reference occasionally made to FIGS. 2 and 3. The sliding member 533 in the instant embodiment includes a sliding bar 5331, a connecting block 5332, and two sliding blocks 5333. The returning member 535 has a compression spring 5351 and a restricting pin 5332.

The sliding bar 5331 passes through the track openings 422 of the connecting portions 42 and remains slidable therewithin. The connecting block 5332 is fixed on a bottom surface of the sliding bar 5331 and faces toward the positioning block 531. The sliding blocks 5333 are fixed on a top surface of the sliding bar 5331, and the positions of the sliding blocks 5333 are respectively corresponding to the gears 51. The sliding blocks 5333 each has one engaging portion 5334.

The connecting bar 534 is pivotally connected to the connecting block 5332. Specifically, the connecting bar 534 and the swing bar 532 are approximately arranged at one side of the sliding bar 5331 away from the engaging portion 5334, and the pivot portion of the connecting bar 534 and the connecting block 5332 and the pivot portion of the swing bar 532 and the positioning block 531 are substantially located at the same level height.

Moreover, two opposite ends of the compression spring 5351 respectively abut against the sliding block 5333 and one of the connecting portions 42, which is distal from the swing bar 532. The restricting pin 5332 is inserted into the compression spring 5351 and the corresponding connecting portion 42, and the restricting pin 5332 is fixed on the sliding block 5333, which is distal from the swing bar 532.

Accordingly, when the swing bar 532 is not pushed and the linkage assembly 53 is at the engaging position, the sliding block 5333, adjacent to the swing bar 532, contacts the inner surface of the corresponding connecting portion 42, and the compression spring 5351 is not compressed.

When the swing bar 532 rotates, leading the linkage assembly 53 to the separating position (as shown in FIGS. 7 and 8), the swing bar 532 carries the sliding bar 5331 to move by the connecting bar 534 and the connecting block 5332. In this regard, the sliding block 5333 and the connecting portion 42 are jointly compressing the compression spring 5351, thereby restoring the returning force generated from the deformation of the compression spring 5351.

Base on the above, the torsion adjusting structure 5 is configured to provide the adjustment of the carrying member 4 in the high torsional state or the low torsional state by operating the swing bar 532 for the user.

Figure 9:
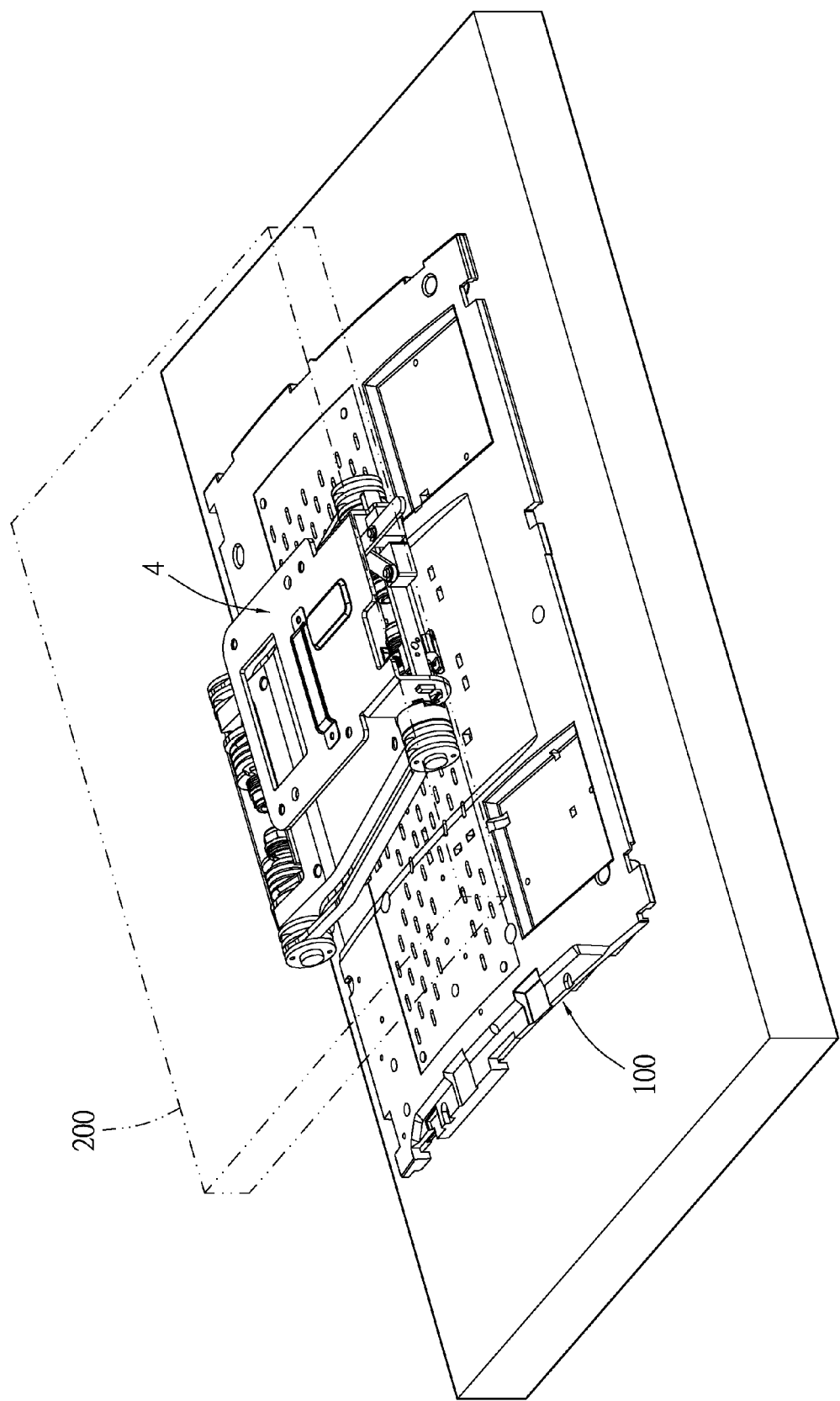
FIG. 9 is a perspective view of the collapsed screen supporting device according to the instant disclosure.

Moreover, when the user wants to operate the screen 200 by touching, the carrying member 4 can be adjusted in the high torsional state for preventing inconvenient operation caused by change of the viewing angle of the screen 200 during operation. When the user wants to collapse the screen supporting device 100, the carrying member 4 can be adjusted in the low torsional state for collapsing the screen supporting device 100 more convenient and with minimum force (as shown in FIG. 9).

Besides, the sliding member 533 in the instant embodiment is constructed by a plurality of components, but the sliding member 533 can be formed in another manner to reduce the number of component of the sliding member 535.

In addition, in another embodiment (not shown in figures), the torsion adjusting structure 5 can be designed to just have one gear 5, one pair of the corresponding friction washers 52, and one corresponding engaging portion 5334.

Additionally, the installed position of the returning member 535 can be adjusted according to the designer's demand. Specifically, according to the different installed positions of the returning member 535, the compression spring 5351 can be replaced by a tension spring, or the restricting pin 5352 can be excluded from the returning member 535. For example, two opposite ends of the tension spring can be respectively fixed on the adjacent surfaces of the positioning block 531 and the connecting block 5332, thereby replacing the compression spring 5351 and the restricting pin 5352.

Base on the above, the screen supporting device is configured with the torsion adjusting structure and the co-operation of the linkage assembly, the gear, and the friction washers to provide the additional torsion selectively, such that the carrying member can be switched to locate at the high torsional state or the low torsional state.

Moreover, when stopping to push the swing bar, the torsion adjusting structure uses the returning member to cause the linkage assembly to be adjusted from the separating position toward the engaging position by the returning force generated from the returning member.

Additionally, the friction force generated between each gear and the abutted friction washers can be adjusted to efficiently control the magnitude of additional torsion. Such as the instant embodiment, each gear has the protrusions formed on the opposite surfaces thereof to increase the friction force generated between each gear and the corresponding friction washers, thereby increasing the additional torsion efficiently.

The descriptions illustrated supra set forth simply the preferred embodiments of the instant disclosure; however, the characteristics of the instant disclosure are by no means restricted thereto. All changes, alternations, or modifications conveniently considered by those skilled in the art are deemed to be encompassed within the scope of the instant disclosure delineated by the following claims.

What is claimed is:

1. A screen supporting device, comprising:
    a bottom seat;
    a frame module having two opposite end portions respectively defined as a bottom end portion and a top end portion, wherein the bottom end portion is pivotally coupled to the bottom seat along a rotation axis;
    a hinge structure pivotally coupled to the top end portion of the frame module, wherein the hinge structure comprises:
        a shaft coupled through the top end portion of the frame module, wherein the shaft has a non-circular cross-section, a longitudinal direction of the shaft is defined as a central axis parallel to the rotation axis; and
        a washer assembly sleeved at the shaft;
    a carrying member for carrying a screen, the carrying member having a thru hole, wherein the shaft is inserted into the thru hole of the carrying member, and the carrying member is pivotable with respect to the shaft along the central axis; and
    a torsion adjusting structure, comprising:
        a gear formed with a circular thru hole along an axial direction thereof, wherein the shaft is inserted into the thru hole of the gear, and the gear is axially rotatable with respect to the shaft along the central axis;
        a pair of friction washers, each of the friction washers having a non-circular positioning opening conforming with the cross-section of the shaft, wherein the shaft is inserted into the positioning opening, and the friction washers respectively abut against two opposite surfaces of the gear; and
        a linkage assembly coupled to the carrying member and having an engaging portion, wherein a longitudinal direction of the engaging portion and the axial direction of the gear are parallel to the central axis, a predetermined distance between the engaging portion and the central axis is smaller than a radius of an addendum circle of the gear, and the engaging portion is movable between any two adjacent teeth of the gear,
    wherein when the linkage assembly horizontally moves along the central axis, the engaging portion is horizontally displaced with respect to the gear and along the central axis, the engaging portion moves along the central axis and parallel to the gear for adjusting the linkage assembly to shift to an engaging position or a separating position in relation to the carrying member;
    wherein when the engaging portion is engaged between any two adjacent teeth of the gear, the position of the linkage assembly is defined as the engaging position, and the positions of the shaft and the friction washers sleeved at the shaft hold still, the rotation of the carrying member drives the gear to axially rotate along the central axis to rub the friction washers, based on the engaging portion of the linkage assembly has engaged the gear, thereby providing the carrying member with an additional torsion;
    wherein when the engaging portion is separated from the gear, the position of the linkage assembly is defined as the separating position, the positions of the shaft and the friction washers sleeved at the shaft hold still, the relative position between the gear and the friction washers is maintained when the carrying member is rotating.

2. The screen supporting device as claimed in claim 1, wherein the linkage assembly has a positioning block, a swing bar, a sliding member, and a connecting bar, the positioning block is fixed on the carrying member, the swing bar is pivotally coupled to the positioning block, the sliding member is slidably configured to the carrying member, two opposite ends of the connecting bar are respectively and pivotally coupled to the swing bar and the sliding member, and the sliding member is formed with the engaging portion, when the swing bar is pushed, the connecting bar is driven and the sliding member slides for adjusting the linkage assembly to shift to the engaging position or the separating position.

3. The screen supporting device as claimed in claim 2, wherein the linkage member has a returning member abutting against the sliding member and the carrying member, and when the sliding member is sliding with respect to the carrying member, the returning member is deformed for storing a returning force.

4. The screen supporting device as claimed in claim 2, wherein the sliding member has a sliding bar, a connecting block, and a sliding block, the sliding bar is slidably configured to the carrying member, the connecting block and the sliding block are fixed on the sliding bar, and the connecting bar is pivotally coupled to the connecting block, the engaging portion is integrally formed on the sliding block.

5. The screen supporting device as claimed in claim 4, wherein the linkage assembly has a compression spring and a restricting pin, two opposite ends of the compression spring respectively abut against the carrying member and the sliding block, the restricting pin passes through the carrying member and the compression spring, and the restricting pin is fixed on the sliding block.

6. The screen supporting device as claimed in claim 1, wherein the top end portion of the frame module has a non-circular positioning opening conforming with the cross-section of the shaft, and the shaft is coupled through the positioning opening of the top end portion of the frame module for enabling the shaft to be supported by the frame module.

7. The screen supporting device as claimed in claim 1, wherein the gear has a plurality protrusions respectively formed on the opposite surfaces thereof, and the protrusions respectively abut against the friction washers.

8. The screen supporting device as claimed in claim 2, wherein the sliding member slides substantially parallel to the central axis.

9. The screen supporting device as claimed in claim 2, wherein any two of the positioning block, the swing bar, the sliding member, and the connecting bar have a hinge axis substantially perpendicular to the central axis.

10. A hinge structure applied for being installed on a shaft having a non-circular cross-section and a carrying member, wherein a longitudinal direction of the shaft is defined as a central axis, the carrying member for carrying a screen is pivotable with respect to the shaft along the central axis, the hinge structure comprising:
- a gear formed with a circular thru hole along an axial direction thereof, wherein the shaft is inserted into the thru hole of the gear, and the gear is axially rotatable with respect to the shaft along the central axis;
- a pair of friction washers, each of the friction washers having a non-circular positioning opening conforming with the cross-section of the shaft, wherein the shaft is inserted into the positioning opening of each friction washer, and the friction washers respectively abut against two opposite surfaces of the gear; and
- a linkage assembly coupled to the carrying member and having an engaging portion, wherein a longitudinal direction of the engaging portion and the axial direction of the gear are parallel to the central axis, a predetermined distance between the engaging portion and the central axis is smaller than a radius of an addendum circle of the gear, and the engaging portion is movable between any two adjacent teeth of the gear,
- wherein when the linkage assembly horizontally moves along the central axis, the engaging portion is horizontally displaced with respect to the gear and along the central axis, the engaging portion moves along the central axis and parallel to the gear for adjusting the linkage assembly to shift to an engaging position or a separating position in relation to the carrying member;
- wherein when the engaging portion is engaged between any two adjacent teeth of the gear, the position of the linkage assembly is defined as the engaging position, and the positions of the shaft and the friction washers sleeved at the shaft hold still, the rotation of the carrying member drives the gear to axially rotate along the central axis to rub the friction washers, based on the engaging portion of the linkage assembly has engaged the gear, thereby providing the carrying member with an additional torsion;
- wherein when the engaging portion is separated from the gear, the position of the linkage assembly is defined as the separating position, the positions of the shaft and the friction washers sleeved at the shaft hold still, the relative position between the gear and the friction washers is maintained when the carrying member is rotating.

\* \* \* \* \*